United States Patent Office 3,657,163
Patented Apr. 18, 1972

3,657,163
EXPANDABLE POLYSTYRENE COMPOSITION FOR INJECTION MOLDING
Hiroshi Kishikawa, Toyonaka-shi, Shintaro Ishikawa, Takatsuki-shi, and Kenji Miyawaki, Ibaraki-shi, Japan, assignors to Sumitomo Chemical Co., Ltd., Osaka, Japan
No Drawing. Filed Oct. 21, 1968, Ser. No. 769,405
Claims priority, application Japan, Oct. 19, 1967, 42/67,556
Int. Cl. C08c *17/08;* C08d *13/08;* C08f *47/10*
U.S. Cl. 260—2.5 E                    20 Claims

ABSTRACT OF THE DISCLOSURE

An expandable polystyrene composition for injection molding consisting of 50–95 parts by weight of a polystyrene resin and 5–50 parts by weight of an ethylene-propylene copolymer and 0.1–5 parts by weight of a decomposable blowing agent or 0.1–10 parts by weight of a gaseous or liquid blowing agent, based on 100 parts by weight of the sum of both of the resins. Foamed polystyrene moldings produced by injection molding and the foaming of said composition have excellent heat stability.

BACKGROUND OF THE INVENTION

Field of the invention

This invention relates to an expandable polystyrene composition for injection molding comprising a mixture of a polystyrene resin, a blowing agent and an ethylene-propylene polymer, to injection moldings of the expandable polystyrene made of said composition, and to a process for producing the same.

Description of the prior art

Hitherto, foamed polystyrenes have been employed widely as insulating materials for refrigerators, building materials, packing materials, buffer materials, and the like.

Recently, it has become popular to produce foamed moldings of polystyrene by injection molding. In this case, a foaming ratio of 1.2–3 times, a low foaming degree is used, and a surface of the moldings has a specific gloss such as pearl, silk or frost, and has a dense shell. However, these foamed moldings formed by injection molding show insufficient heat resistance.

It is well known that polystyrene is incompatible with the polyolefins. Usually, "tearing-off" and lowering of transparency will result from a mix of both of them. It would easily be concluded that compatibility between polystyrene and an ethylene-propylene copolymer, a kind of polyolefin, would be poor.

SUMMARY OF THE INVENTION

The present inventors have unexpectedly found that ethylene-propylene polymers can be intimately mixed by melting with a styrene polymer in the presence of a blowing agent, and that foamed polystyrene moldings having remarkably improved heat resistance can be obtained without injuring the mechanical strength thereof.

The present invention basically comprises an expandable polystyrene composition for injection molding consisting of a polystyrene resin, an ethylene-propylene copolymer and a blowing agent. Two basic embodiments are proposed. First, a blowing agent per se may be utilized to expand the polystyrene; secondly, an expandable polystyrene itself may be utilized as a blowing agent. When a blowing agent per se is utilized, from about 5 to about 50 parts by weight of ethylene-propylene copolymer are added to 5 to about 95 parts by weight of polystyrene so that the total amount of resin represents 100 parts by weight. Into this mixture from about 0.1 to about 5 parts of a blowing agent is added.

In the case that an expandable polystyrene itself is used, from about 95 to about 50 parts by weight of polystyrene are mixed with about 5 to about 50 parts by weight of ethylene-propylene copolymer so that the total amount of the resin is 100 parts by weight. The mixture is dry blended, and from about 20 to about 100% of the polystyrene in the desired polystyrene composition is derived from the expandable polystyrene which is used as the blowing agent.

Gaseous and liquid blowing agents may be utilized. The amount of blowing agent is usually from about 0.1 to about 10% by weight of the polystyrene composition.

A process for producing the foamed polystyrene injection molding comprises heating an expandable polystyrene composition prepared from one of the above mixes to a temperature greater than the foaming temperature of the blowing agent under a pressure such that foaming of the blowing agent does not occur whereby the polystyrene composition is melted. The polystyrene is injected into a metal mold whereby said polystyrene composition foams simultaneously with molding. The moldings are then cooled. Various terpolymer blends and the like may also be used in the present invention, all specific materials being more explicitly defined in the description of the preferred embodiments.

An object of the present invention is to provide foamed polystyrene moldings having improved heat resistance without injuring mechanical strength thereof.

Other objects of the present invention will be clear by the following description.

DESCRIPTION OF THE PREFERRED EMBODIMENTS

In order to accomplish the objects of the invention, the present invention provides an expandable polystyrene composition for injection molding consisting of a polystyrene resin, an ethylene-propylene polymer and a blowing agent.

As the polystyrene resin used in the present invention as the first ingredient of the composition, generally available polystyrene resins known to those skilled in the art are employed, which include homopolymers of styrene, graft polymers of polystyrene and polybutadiene, copolymers of styrene and butadiene, acrylonitrile, or other copolymerizable monomers, and mixtures thereof.

The ethylene-propylene polymer, the second ingredient, includes copolymers and block copolymers of ethylene and propylene, terpolymers of ethylene, propylene and a small amount of a third component such as dicyclopentadiene, 1,4-hexadiene, ethylidene norbornene and cyclooctadiene, and mixtures thereof. The ethylene content in the ethylene-propylene polymer may be varied in a wide range, generally in a range of 5–80 mole percent. The resins used generally have a molecular weight within the range of from 100,000–200,000. The terpolymers generally have a 40–80% major resin component composition.

The blowing agent, the third ingredient, is not limited, and includes inorganic decomposable blowing agents such as, for example, sodium bicarbonate, ammonium bicarbonate and sodium boron hydride; and organic decomposable blowing agents such as, for example, azo compounds such as azo-dicarbonamide, azo-bis formamide; nitroso compounds such as dinitroso pentamethylene tetramine and dinitroso terephthalamide; and sulfonyl hydrazides such as p-toluenesulfonyl semicarbazide and benzenesulfonyl hydrazide. In the present invention, it is not always necessary to use the blowing agent itself, as expandable polystyrenes including 1–10% by weight of a gaseous or liquid blowing agent known to the art, such as known hydrocarbons or chlorinated hydrocarbons boiling at —40 to 80° C. under a normal pressure, as, for example, petroleum ethers, pentane, hexane, cyclohexane, methyl chloride, dichlorodifluoromethane, trichloromonofluoromethane, propane and butane can be employed as well. This embodiment is usually prepared by impregnating the polystyrene resin with the blowing agent, with or without pressure, may be employed as the simultaneous blowing agent.

Accordingly, there are two embodiments for preparing the expandable polystyrene composition of the present invention, that is (a) the case of employing a blowing agent itself; and (b) the case of employing an expandable polystyrene as a blowing agent.

In case (a), 5–50 parts by weight, preferably 5–30 parts by weight, of ethylene-propylene polymer are added to 50–95 parts by weight of polystyrene so that the total amount of resin represents 100 parts by weight. In to said mixture, 0.1–5 parts by weight of a blowing agent and, if desired, other ingredients such as pigments, are added. The mixture is dry blended to give the desired polystyrene composition.

In case (b), 95–50 parts by weight of polystyrene are mixed with 5–50 parts by weight of ethylene-propylene polymer so that the total amount of the resin is 100 parts by weight. The mixture is dry-blended to give the desired polystyrene composition. In this case, 20–100% of the polystyrene in the desired polystyrene composition is derived from the expandable polystyrene which is used as the blowing agent. The amount of blowing agent included in the present polystyrene compositions is about 0.1 to about 10% by weight.

Mixing of the polystyrene resin, the ethylene-propylene polymer and the blowing agent or the expandable polystyrene resin for the preparation of the expandable polystyrene composition for injection molding of the present invention takes place by known methods. For example, the polystyrene resin and the ethylene-propylene polymer may be employed in the form of pellets, which are homogenerously mixed.

In the present invention, foamed polystyrene moldings are produced by the following common method. Specifically, the expandable polystyrene composition for injection molding (prepared as set out above) is melted by heating it to a temperature of greater than the foaming point of the blowing agent, under a pressure such that foaming does not occur. The resultant melted expandable polystyrene composition is molded by injecting it from a nozzle into a metal mold, whereby foaming results, since the pressure reduces to normal pressure simultaneously with injection.

Temperature for melting the expandable polystyrene composition of the invention are generally in a range of 150–300° C., and pressures for injecting are in a range of 500–1500 kg./cm.$^2$. The degree of foaming is generally 1.2–3 times. The foamed polystyrene molding is produced by cooling in the metal mold.

The foamed polystyrene moldings of the present invention are remarkably improved in their resistance, without showing any deterioration in mechanical strength, such as impact strength and bending strength. Further, the present invention has an economical advantage in that the ethylene-propylene polymer serves as an increasing agent for the polystyrene. However, when the ethylene-propylene polymer is present in an amount of more than 50 parts by weight in the polystyrene composition of the present invention, not only are suitable moldings not obtained (dependent on the kind of ethylene-propylene polymer), but there is also no improvement in the heat resistance. Further, when the ethylene-propylene is present in an amount of less than 5 parts by weight, the improvement in the heat resisting property of the polystyrene moldings is not noted.

The present invention will now be explained in greater detail by the following examples, however, it is to be understood that the present invention is not limited thereby. The polystyrene resin per se which was used had a molecular weight of 100,000 to 200,000 in all cases. The materials are broadly trademarked Royalene 301.

EXAMPLE 1

90 and 80 parts by weight of a commercial transparent styrene polymer and 10 and 20 parts by weight of an ethylene-propylene copolymer, respectively [the ethylene-propylene copolymer (ethylene content 5–10%) produced as a soluble byproduct in the polymerization medium of an ethylene-propylene copolymer separation using a Ziegler-Natta coordination catalyst], and 0.5 part by weight of azodicarbonamide were mixed for five minutes by an agitation type blender. The mixtures were then molded using a screw-injection molding machine at a cylinder temperature of 190° C. and an injection pressure of 45 kg./cm.$^2$ gauge to produce square pillashaped moldings having a 12.7 cm. length and a 1.27 cm. width and thickness. The rate of foaming of each was 1.2, 1.5 and 1.8 times, respectively. By measurement of the heat resisting strength, namely the heat distortion temperature (fiber stress 18.6 kg./cm.$^2$) by Japanese Industrial Standard and the Sharply (with notch) impact strength, the following results were obtained. A pure polystyrene sample was run as a comparative example.

(I) HEAT DISTORTION TEMPERATURE (° C.)

| | Polystyrene, parts by weight | Ethylene-propylene copolymer, parts by weight | Rate of foaming | | |
|---|---|---|---|---|---|
| | | | 1.2 times, ° C. | 1.5 times, ° C. | 1.8 times, ° C. |
| Comparative example | 100 | 0 | 73.0 | 70.8 | 70.2 |
| Sample (a) | 90 | 10 | 79.7 | 77.6 | 75.4 |
| Sample (b) | 80 | 20 | 79.7 | 76.9 | 75.5 |

This table shows that the heat resisting property of the composition of this invention is a remarkable improvement over a pure polystyrene sample.

(II) SHARPY (WITH NOTCH) IMPACT STRENGTH (KG.-CM./CM.$^2$)

| | Polystyrene, parts by weight | Ethylene-propylene copolymer | Rate of foaming | | |
|---|---|---|---|---|---|
| | | | 1.2 times | 1.5 times | 1.8 times |
| Contrast | 100 | 0 | 1.8 | 1.5 | 1.1 |
| Sample (a) | 90 | 10 | 1.9 | 1.6 | 1.4 |
| Samples (b) | 80 | 20 | 2.4 | 1.5 | 1.4 |

Notwithstanding the fact that impact strength generally lowers when compatibility is poor, the compositions of this invention showed an excellent impact strength, as shown in said table.

EXAMPLE 2

Moldings having the following heat distortion temperature and impact strength and a 1.5 degree of foaming were produced by molding a mixture of 90 parts by weight of an impact-resistant polystyrene [which was grafted with 7% of a commercial polybutadiene], 10 parts by weight of the same ethylene-propylene copolymer in Example 1, and 0.5 part by weight of azodicarbonamide, using the same procedure and conditions as in Example 1.

| | Polystyrene, parts by weight | Ethylene-propylene copolymer, parts by weight | Heat distortion temperature, °C. | Impact strength, kg.-cm./cm.² |
|---|---|---|---|---|
| Contrast | 100 | 0 | 73.7 | 5.9 |
| Sample of this invention | 90 | 10 | 77.9 | 5.6 |

EXAMPLE 3

Moldings having the following heat distortion temperature and impact strength, and a 1.5 degree of foaming were produced by molding a mixture of 90 parts by weight of a commercial transparent styrene polymer, 10 parts by weight of the same ethylene-propylene copolymer used in Example 1, and 1.0 parts by weight of dinitroso pentamethylene tetramine. The same procedure and conditions as in Example 1 were utilized.

| | Polystyrene, parts by weight | Ethylene-propylene copolymer, parts by weight | Heat distortion temperature, °C. | Impact strength, kg.-cm./cm.² |
|---|---|---|---|---|
| Comparative sample | 100 | 0 | 70.8 | 1.5 |
| Sample of this invention | 90 | 10 | 80.0 | 1.6 |

EXAMPLE 4

Moldings having the following heat distortion temperature and impact strength, and a 1.5 degree of foaming were produced by molding a mixture of 90 parts by weight of a commercial transparent styrene polymer, 10 parts by weight of the same ethylene-propylene copolymer used in Example 1, and 1.0 part by weight of n-toluenesulfonyl semicarbazide. The same procedure and conditions as in Example 1 were used.

| | Polystyrene, parts by weight | Ethylene-propylene copolymer, parts by weight | Heat distortion temperature, °C. | Impact strength, kg.-cm./cm.² |
|---|---|---|---|---|
| Comparative example | 100 | 0 | 70.8 | 1.5 |
| Sample of this invention | 90 | 10 | 80.1 | 1.5 |

EXAMPLE 5

Moldings having the following heat distortion temperature and impact strength and a 1.5 degree of foaming were produced by molding a mixture of 90 parts by weight of a commercial transparent styrene polymer, 10 parts by weight of the same ethylene-propylene copolymer as in Example 1 and 1.0 part by weight of sodium bicarbonate, using the same procedure and conditions as in Example 1.

| | Polystyrene, parts by weight | Ethylene-propylene copolymer, parts by weight | Heat distortion temperature, °C. | Impact strength, kg.-cm./cm.² |
|---|---|---|---|---|
| Comparative example | 100 | 0 | 70.8 | 1.5 |
| Sample of this invention | 90 | 10 | 81.3 | 1.4 |

EXAMPLE 6

Moldings having the following heat distortion temperature and impact strength, and a 1.5 degree of foaming were produced by molding a mixture of 50 parts by weight of a commercial transparent styrene polymer, 40 parts by weight of expandable polystyrene beads impregnated with a pentane hydrocarbon compound having a low boiling point, and 10 parts by weight of the same ethylene-propylene copolymer used in Example 1. The same procedure and conditions as in Example 1 were utilized.

| | Polystyrene, parts by weight | Expandable beads, parts polystyrene by weight | Ethylene propylene copolymer, parts by weight | Heat distortion temp., °C. | Impact strength kg.-cm./cm.² |
|---|---|---|---|---|---|
| Comparative example | 60 | 40 | 0 | 68.8 | 1.2 |
| Sample of this invention | 50 | 40 | 10 | 73.5 | 1.1 |

EXAMPLE 7

Moldings having the following heat distortion temperature and impact strength, and a 1.5 degree of foaming were produced by molding a mixture of 90 parts by weight of a commercial transparent styrene polymer, 10 parts of a crystalline ethylene-propylene copolymer [ethylene content 2-4%, which was produced by employing a Ziegler-Natta catalyst and which was insoluble in the polymerization medium] and 0.5 part by weight of azo-dicarbonamide. The same procedure and conditions as in Example 1 were utilized.

|  | Polystyrene, parts by weight | Ethylene-propylene copolymer, parts by weight | Heat distortion temperature, °C. | Impact strength, kg.-cm./cm.² |
|---|---|---|---|---|
| Comparative example | 100 | 0 | 70.8 | 1.5 |
| Sample of this invention | 90 | 10 | 82.5 | 1.4 |

EXAMPLE 8

Moldings having the following heat distortion temperature and impact strength and a 1.5 degree of foaming were produced by molding a mixture of 90 parts by weight of a commercial ethylene - propylene rubber [ethylene content 30-50%] and 0.5 part by weight of azodicarbonamide. The same procedure and conditions as in Example 1 were utilized.

|  | Polystyrene, parts by weight | Ethylene-propylene copolymer, parts by weight | Heat distortion temperature, °C. | Impact strength, kg.-cm./cm.³ |
|---|---|---|---|---|
| Comparative example | 100 | 0 | 70.8 | 1.5 |
| Sample of this invention | 90 | 10 | 81.0 | 1.6 |

EXAMPLE 9

Moldings having the following heat-distortion temperature and impact strength, and a 1.5 degree of foaming were produced by molding a mixture of 90 parts by weight of commercial transparent styrene polymer, 10 parts by weight of a commercial three-component elastic copolymer comprising ethylene-propylene-dicyclopentadiene (40-80% ethylene-propylene) and 0.5 part by weight of azo-dicarbonamide. The same procedure and conditions as in Example 1 were used.

|  | Polystyrene, parts by weight | Ethylene-propylene copolymer, parts by weight | Heat distortion temperature, °C. | Impact strength, kg.-cm./cm.² |
|---|---|---|---|---|
| Comparative example | 100 | 0 | 70.8 | 1.5 |
| Sample of this invention | 90 | 10 | 79.9 | 1.5 |

What is claimed is:

1. An expandable polystyrene composition for injection molding comprising from about 50 to about 95 parts by weight of a polystyrene resin, from about 5 to about 50 parts by weight of an ethylene-propylene copolymer having an ethylene content ranging from 5-80 mole percent and a member selected from the group consisting of from about 0.1 to about 5 parts by weight of a decomposable blowing agent and from about 0.1 to about 10 parts by weight of a gaseous or liquid blowing agent based on 100 parts by weight of the total of both resins.

2. The composition of claim 1 wherein the gaseous or liquid blowing agent is a member selected from the group consisting of hydrocarbons and chlorinated hydrocarbons having a boiling point ranging from about $-40°$ to about $80°$ C., the agent being included in the polystyrene resin in an amout ranging from about 1 to about 10 percent by weight.

3. The composition of claim 2 wherein the blowing agent is a member selected from the group consisting of petroleum ethers, pentane, hexane, cyclohexane, methyl chloride, dichlorodifluoromethane, trichloromonofluoromethane, propane and butane.

4. The composition of claim 1 wherein the decomposable blowing agent is a member selected from the group consisting of sodium bicarbonate, azo-dicarbonamide, dinitroso pentamethylene tetramine and p-toluene sulfonyl semi-carbazide.

5. The composition of claim 1 wherein the polystyrene resin is a member selected from the group consisting of a homopolymer styrene and a graft polymer of polystyrene and polybutadiene.

6. The composition of claim 1 wherein the ethylene-propylene copolymer is a member selected from the group consisting of a copolymer of ethylene and propylene, a terpolymer of ethylene, propylene and a small amount of a third component and mixtures thereof.

7. The composition of claim 1 wherein the ethylene-propylene copolymer is a member selected from the group consisting of an ethylene-propylene copolymer having an ethylene content of from about 5 to about 10 percent, the copolymer being produced as a by-product which is soluble in the polymerization medium of an ethylene-propylene copolymer preparation employing a Ziegler-Natta coordination catalyst, a crystalline ethylene-propylene copolymer having an ethylene content ranging from about 2 to about 4 percent which is produced during the copolymerization of ethylene and propylene employing a Ziegler, Natta catalyst, which is insoluble in the polymerization medium, an ethylene-propylene rubber with an ethylene content ranging from about 30 to about 50 percent, and a three-component rubbery copolymer comprising ethylene-propylene-dicyclopentadiene.

8. Injection moldings formed from the expandable polystyrene composition of claim 1.

9. A process for producing foamed polystyrene injection moldings which comprises:
(a) heating an expandable polystyrene composition prepared by mixing from about 50 to about 95 parts by weight of a polystyrene resin, from about 5 to about 50 parts by weight of an ethylene-propylene polymer having an ethylene content ranging from 5–80 mole percent and a member selected from the group consisting of from about 0.1 to about 10 parts by weight of a gaseous or liquid blowing agent and from about 0.1 to about 5 parts by weight of a decomposable blowing agent based on 100 parts by weight of the sum of said resins to obtain an expandable polystyrene composition,
(b) heating the thus obtained expandable polystyrene composition to a temperature greater than the foaming temperature of the blowing agent under a pressure such that the foaming of the blowing agent does not occur, whereby said polystyrene composition is melted,
(c) injecting the resultant melted polystyrene composition into a mold whereby said polystyrene composition is foamed simultaneously with mold, and
(d) cooling the moldings.

10. The process of claim 9 wherein the gaseous or liquid blowing agent is a member selected from the group consisting of hydrocarbons and chlorinated hydrocarbons having a boiling point ranging from about −40° to about 80° C., the agent being included in the polystyrene resin in an amount raging from about 1 to about 10 percent by weight.

11. The process of claim 10 whrein the blowing agent is a member selected from the group consisting of petroleum ethers, pentane, hexane, cyclohexane, methyl chloride, dichlorodifluoromethane, trichloromonofluoromethane, propane and butane.

12. The process of claim 9 wherein the decomposable blowing agent is a member selected from the group consisting of sodium bicarbonate, azo-bicarbonamide, dinitroso pentamethylene tetramine and p-toluene sulfonyl semi-carbazide.

13. The process of claim 9 wherein the polystyrene resin is a member selected from the group consisting of a homopolymer of styrene and a graft polymer of polystyrene and polybutadiene.

14. The process of claim 9 wherein the ethylene-propylene copolymer is a member selected from the group consisting of a copolymer of ethylene and propylene, a terpolymer of ethylene, propylene and a small amount of a third component and mixtures thereof.

15. Expandable styrene injection moldings produced by the process of claim 9 wherein said composition comprises from about 50 to about 95 parts by weight of a polystyrene resin, from about 5 to about 50 parts by weight of an ethylene-propylene polymer having an ethylene content ranging from 5–80 mole percent and a member selected from the group consisting of from about 0.1 to about 10 parts by weight of a gaseous or liquid blowing agent and from about 0.1 to about 5 parts by weight of a decomposable blowing agent based on 100 parts by weight of the sum of said resins.

16. The injection moldings of claim 15 wherein the gaseous or liquid blowing agent is a member selected from the group consisting of hydrocarbons and chlorinated hydrocarbons having a boiling point ranging from about −40° to about 80° C., the agent being included in the polystyrene resin in an amount ranging from about 1 to about 10 percent by weight.

17. The injection moldings of claim 15 wherein the blowing agent is a member selected from the group consisting of petroleum ethers, pentane, hexane, cyclohexane, methyl chloride, dichlorodifluoromethane, trichloromonofluoromethane, propane and butane.

18. The injection moldings of claim 15 wherein the decomposable blowing agent is a member selected from the group consisting of sodium carbonate, azo-dicarbonamide, dinitroso pentamethylene tetramine and p-toluene sulfonyl semi-carbazide.

19. The injection moldings of claim 15 wherein the polystyrene resin is a member selected from the group consisting of a homopolymer of styrene and a graft polymer of polystyrene and polybutadiene.

20. The injection moldings of claim 15 wherein the ethylene-propylene polymer is a member selected from the group consisting of a copolymer of ethylene and proylene, a terpolymer of ethylene, propylene and a small amount of a third component and mixtures thereof.

References Cited

UNITED STATES PATENTS

| | | | |
|---|---|---|---|
| 3,432,447 | 3/1969 | Patterson et al. | 260—897 A |
| 3,224,984 | 12/1965 | Roper et al. | 260—2.5 B |
| 3,457,205 | 7/1969 | Nonweiler | 260—897 |
| 3,404,104 | 10/1968 | Hill | 260—2.5 |
| 3,364,284 | 1/1968 | Edmonds et al. | 260—897 |
| 3,250,730 | 5/1966 | Palmer | 260—2.5 |
| 3,207,711 | 9/1965 | Spenandel et al. | 260—2.5 |
| 3,065,190 | 11/1962 | Chisholm et al. | 260—2.5 |

SAMUEL H. BLECH, Primary Examiner

R. B. TURER, Assistant Examiner

U.S. Cl. X.R.

260—2.5 B, 876 RB, 889, 897 A